(12) United States Patent
Bremmer et al.

(10) Patent No.: US 8,440,045 B2
(45) Date of Patent: May 14, 2013

(54) CONFORMAL DELTOID NOODLE FOR A COMPOSITE STRUCTURE

(75) Inventors: Jonathan Bremmer, Glastonbury, CT (US); Robert A. Lacko, Oxford, CT (US); Jeffrey G. Sauer, Woodbury, CT (US); Paul H. Denavit, Woodbridge, CT (US); William E. Hovan, Oxford, CT (US); Edward J. Fabian, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 13/232,267

(22) Filed: Sep. 14, 2011

(65) Prior Publication Data

US 2013/0062808 A1  Mar. 14, 2013

(51) Int. Cl.
*B32B 31/18* (2006.01)
(52) U.S. Cl.
USPC ............ 156/293; 156/250; 156/256; 156/257
(58) Field of Classification Search .................. 156/293, 156/257, 250, 256
See application file for complete search history.

(56) References Cited

U.S. PATENT DOCUMENTS

| | | | | |
|---|---|---|---|---|
| 4,656,674 A * | 4/1987 | Medwell | ............................ | 2/410 |
| 5,538,589 A * | 7/1996 | Jensen et al. | .................... | 156/581 |
| 6,709,538 B2 | 3/2004 | George et al. | | |
| 7,312,274 B2 | 12/2007 | Millard et al. | | |
| 7,534,319 B2 * | 5/2009 | Mead et al. | ..................... | 156/259 |
| 2004/0043829 A1 * | 3/2004 | Ryu | .............................. | 473/318 |
| 2010/0189566 A1 | 7/2010 | Harrison | | |

OTHER PUBLICATIONS

Kodi Rider, et al., Composite I-Beam Fabrication and Testing in Response to 14th Annual SAMPE Bridge Competition, Aerospace Engineering Dept., California Polytechnic State University, Jun. 8, 2011, 49 pages.

* cited by examiner

*Primary Examiner* — Jeff Aftergut
*Assistant Examiner* — Jaeyun Lee
(74) *Attorney, Agent, or Firm* — Cantor Colburn LLP

(57) ABSTRACT

A method of fabricating a conformal deltoid noodle includes providing a composite prepreg material having a predetermined length and a width, the predetermined length being aligned along a longitudinal axis; subjecting the composite prepreg material to a cutting process to form a notched section coextensive along the predetermined length; and rolling the composite prepreg material along its width to create the conformal deltoid noodle.

17 Claims, 5 Drawing Sheets

CONFORMAL DELTOID NOODLE FOR A COMPOSITE STRUCTURE

STATEMENT REGARDING FEDERALLY SPONSORED RESEARCH OR DEVELOPMENT

This invention was made with Government support under Contract No. N00019-06-C-0081 awarded by the Department of the Navy. The Government has certain rights in this invention.

FIELD OF INVENTION

The subject matter disclosed herein relates generally to the field of manufacturing of composite structures and, more particularly, to the design and use of a conformal deltoid noodle for filling a deltoid in composite structures that use a deltoid filler material.

DESCRIPTION OF RELATED ART

Fiber reinforced composites have been used in the manufacture of articles, especially for applications where high-strength and lightweight properties are desirable. These composites are engineered or naturally occurring materials made from two or more constituent materials, including fibers arranged in a predetermined or random arrangement. Fibers are strands of homogenous material that are laid out in a unidirectional configuration, woven in at least two directions, or veil configurations. Additionally, these fiber composites are pre-impregnated with a suitable resin matrix and have become accepted by their generic names, such as "advance composites" or "prepreg".

BRIEF SUMMARY

According to one aspect of the invention, a method of fabricating a conformal deltoid noodle, includes providing a composite prepreg material having a predetermined length and a width, the predetermined length being aligned along a longitudinal axis; subjecting the composite prepreg to a cutting process to form a notched section coextensive along the predetermined length; and rolling the composite prepreg along its width to create a deltoid noodle. The composite prepreg material includes unidirectional fibers aligned along the longitudinal axis while the deltoid noodle includes a cylindrical shape longitudinally coextensive with the longitudinal axis.

According to another aspect of the invention, a method of fabricating a composite component having reinforcement fibers, includes providing a platform perform having a predetermined length extending in a direction parallel to a plane, the platform perform including a first surface, and an opposed second surface; providing a body perform including a first portion with the predetermined length which extends in a first direction and a second portion which extends in a direction lateral to the first direction, the body perform defining a cavity coextensive with the first portion along the predetermined length; engaging the platform perform with the first portion to define a deltoid cavity along the predetermined length; forming a deltoid noodle having the predetermined length and comprising chopped fibers and unidirectional fibers; inserting the deltoid noodle in the deltoid cavity; and performing the curing process to bond the platform perform and the body perform to the deltoid noodle, thereby to form the composite component.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a conformal deltoid noodle (also referred to as a "deltoid filler") for filling closed cavity sections (or "deltoid") of composite structures are discussed below in detail. The deltoid noodle is made from a unidirectional or woven graphite-fiber prepreg and is processed to make it conformal to the manufacturing process through the deltoid noodles ability to flow into the deltoid of composite structures. This ability to flow and fill the deltoid areas causes it to accommodate tooling mismatches during manufacturing of the composite structure that utilize a deltoid noodle. Further, the deltoid noodle is rolled into a cylinder to create a continuous strand, and includes a chopped or sliced center portion that allows the deltoid noodle to flow and conform to the deltoid in the composite structure.

Figure 1:
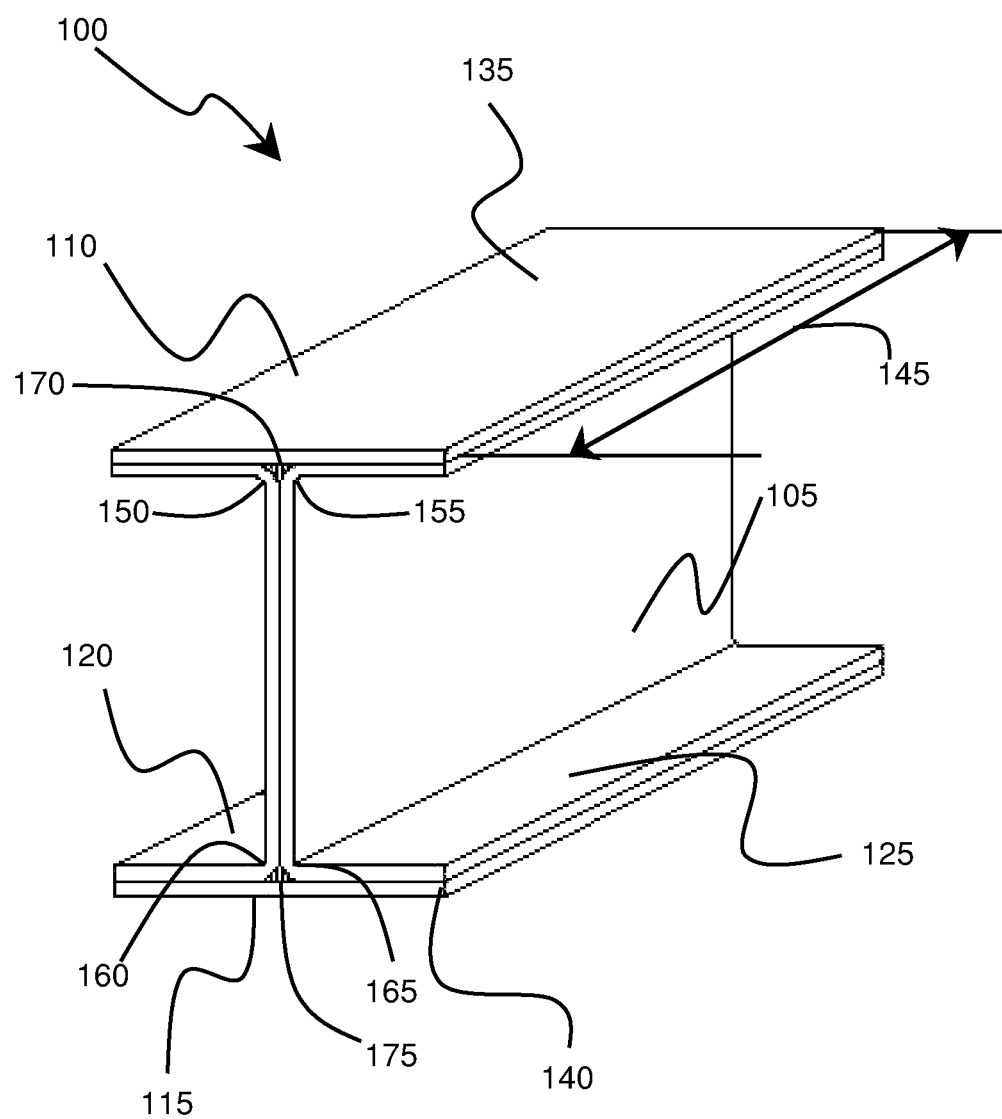
FIG. 1 illustrates a perspective sectional view of a composite structure utilizing a deltoid noodle according to an embodiment of the invention.

Referring now to the drawings, FIG. 1 is an isometric view of a composite structural member 100, for example, an I-beam having a cured deltoid noodle 170 according to an embodiment of the invention. Particularly, the structural member 100 is made from, in one embodiment, a composite material such as, for example, a graphite-fiber unidirectional prepreg and includes a cured deltoid noodle 170 that is made from the same material as the structural member 100 in order to fill a deltoid cavity in the structural member 100. In other embodiments, the structural member 100 may be made from a woven prepreg pattern having fiberglass, carbon fiber, kevlar, or other similar types of materials. The structural member 100 is manufactured by co-curing pre-formed C-channel portions 120, 125, pre-formed rectangular strips 135, 140 that are substantially coplanar along their lengths, and substantially similar deltoid noodles 201, 202 (shown in FIG. 2A) to form the web portion 105, the first flange portion 110, and an opposing second flange portion 115. In one embodiment, the web portion 105 and flange portions 110, 115 includes fibres, which extend generally lengthwise along the length 145 of the member 100, although other orientations of the fibers may be utilized without departing from the scope of the invention. Also, a "deltoid" or cavity is formed along the backing radii 150, 155 where C-channel portions 120, 125 meet while a deltoid is formed along the backing radii 160, 165 where C-channel portions 120, 125 meet. In one embodiment, the C-channel portion 120, 125, deltoid noodles 201, 202, and rectangular strips 135, 140 may be formed from the same composite material when forming the composite structure, although dissimilar composite materials may also be utilized in other embodiments.

Further, the deltoids are filled with an uncured deltoid noodle 201, 202 (FIG. 2A) and co-cured with heat to form a cured deltoid noodle 170, 175 in order to maintain a fiber volume in order to reinforce the structural member 100. It is to be appreciated that a continuous deltoid noodle, such as deltoid noodle 201, 202 (FIG. 2A) is provided to fill each deltoid in structural member 100 that may have varying bulk factors along its length 145. It is also to be appreciated that continuous noodles 201, 202 (FIG. 2A) improve on the manufacturing of the structural member 100 by preventing over filling or under-filling the deltoid cavities as is typical of previous deltoid noodles. Over-filling the deltoid cavity may prevent C-channel portions 120, 125 and strip portions 135, 140 from collapsing together when forming structural member 100 due to excess material in certain portions of the deltoid cavity that does not flow into the other areas of the deltoid cavity when cured, while under filling the deltoid cavity may cause voids within the deltoid cavity and thereby affect the structural integrity of the member 100.

Figure 2A:
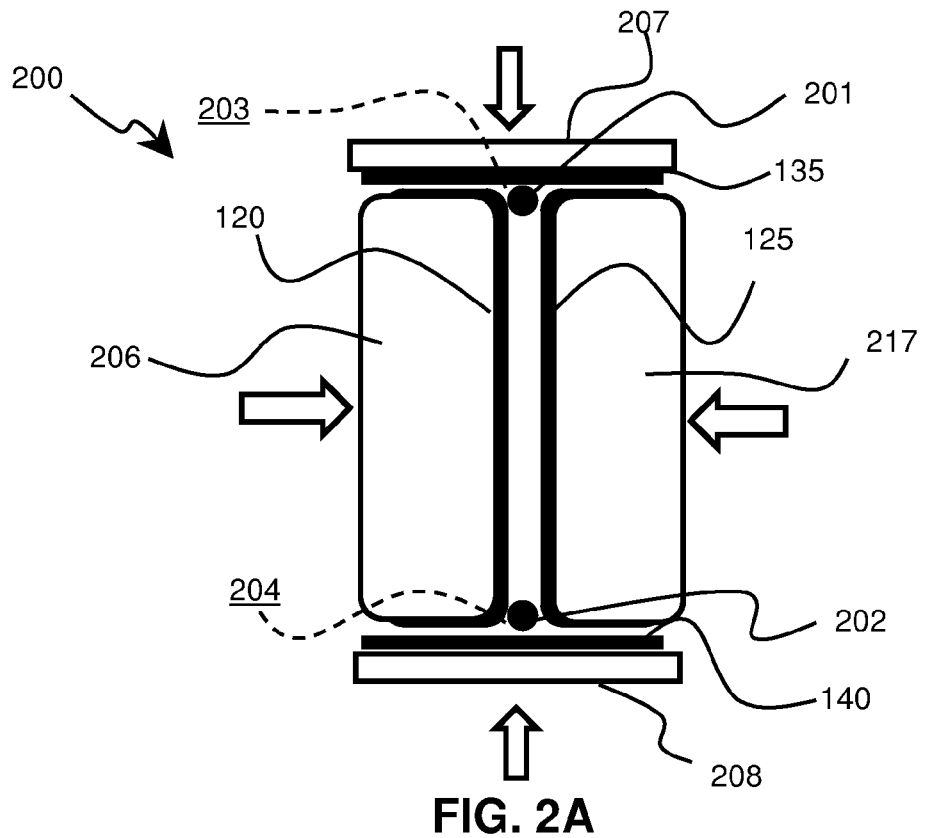
FIG. 2A illustrates a front view of a tooling assembly including the pre-preformed portions of a composite material according to an embodiment of the invention.

FIG. 2A illustrates a front view of a tooling assembly 200 including the pre-preformed portions of composite material according to an embodiment of the invention. Particularly, the structural member 100 of FIG. 1 is formed by co-curing pre-formed C-channel portions 120, 125 compacted by tool portions 206 and 217, pre-formed coplanar rectangular strips 135, 140 compacted by tool portions 207 and 208, and deltoid noodles 201, 202 made, in one embodiment, from the same composite material as portions 120, 125 and strips 135, 140, which fill the respective deltoids 203, 204. It is to be appreciated that deltoid noodle 201 is formed from a substantially identical process as deltoid noodle 202, and thus a description of the process for forming noodle 201 provides an adequate description of the process for forming deltoid noodle 202.

Figure 2B:
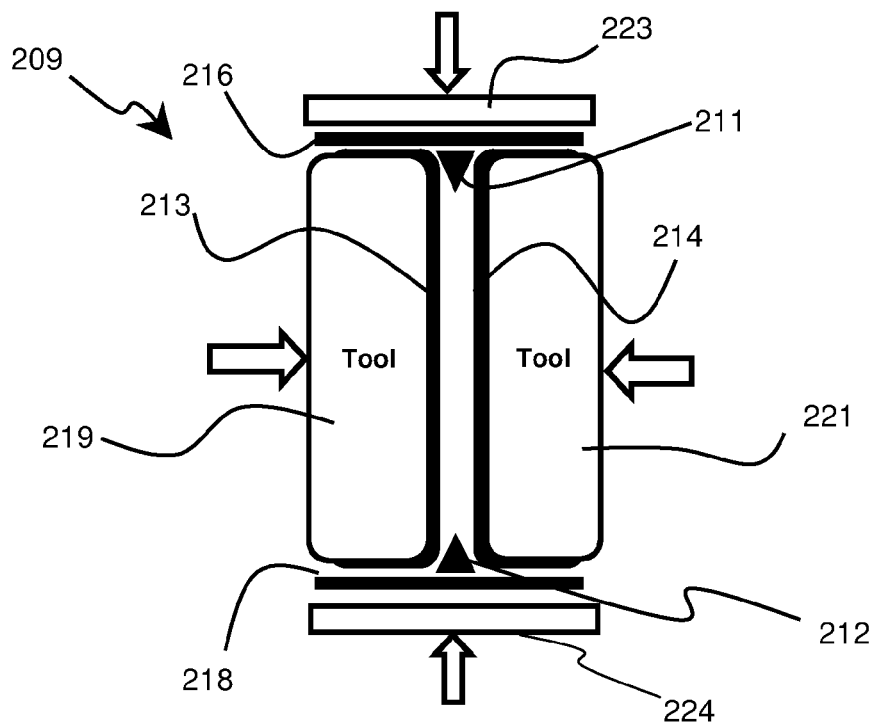
FIG. 2B illustrates a front view of a tooling assembly including a configuration of a deltoid noodle according to an embodiment of the invention.

FIG. 2B illustrates a configuration of a deltoid noodle used for forming the composite structure 100 (FIG. 1) according to another embodiment of the invention. Particularly, the deltoid noodles 201, 202 (shown in FIG. 2A) may be compacted (debulked) in a die to form a generally triangular-shaped deltoid noodle 211, 212, while all other aspects of the tooling assembly 209 including tool portions 219, 221, 223, 224, pre-formed C-channel portions 213, 214, and pre-formed rectangular strips 216, 218 remain substantially the same as the embodiment shown and described in FIG. 2A.

Figure 2C:
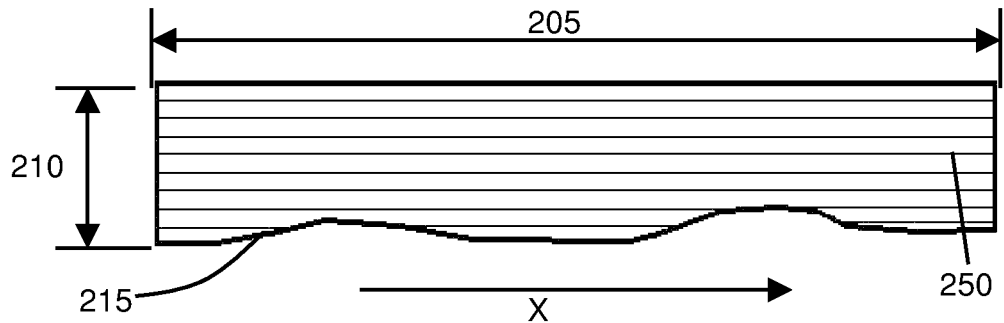
FIG. 2C illustrates a top view of a unidirectional graphite-fiber prepreg according to an embodiment of the invention.
Figure 2D:
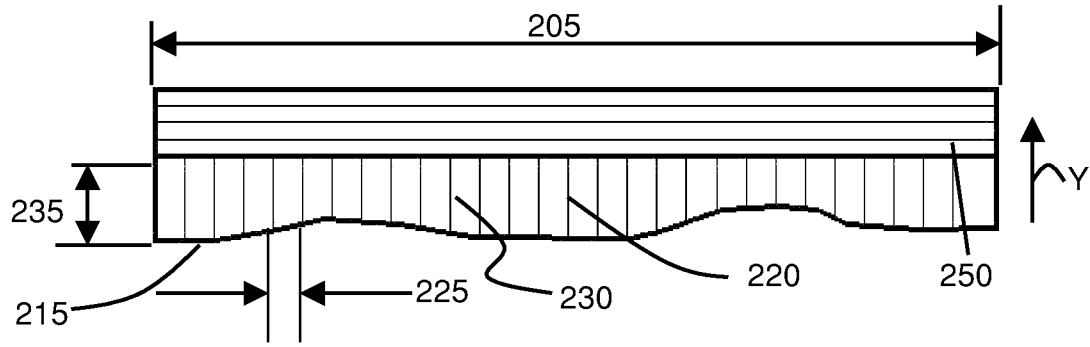
FIG. 2D illustrates a top view of a unidirectional graphite-fiber prepreg including a partially notched section according to an embodiment of the invention.
Figure 2E:
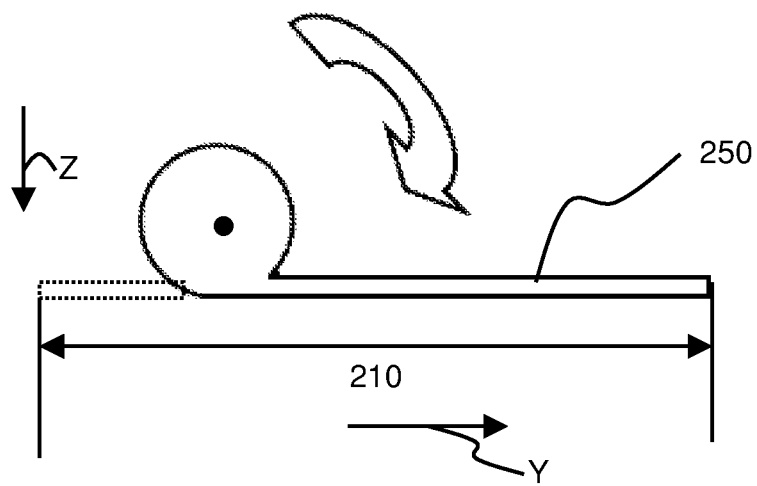
FIG. 2E illustrates a side view of partially rolled graphite-fiber prepreg according to an embodiment of the invention.
Figure 2F:
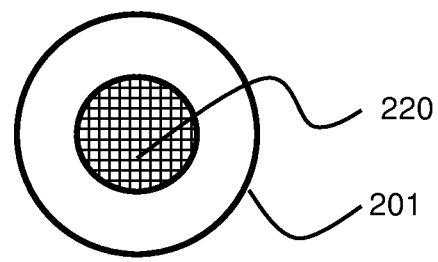
FIG. 2F illustrates a side sectional view of a fully rolled graphite-fiber prepreg according to an embodiment of the invention.
Figure 3:
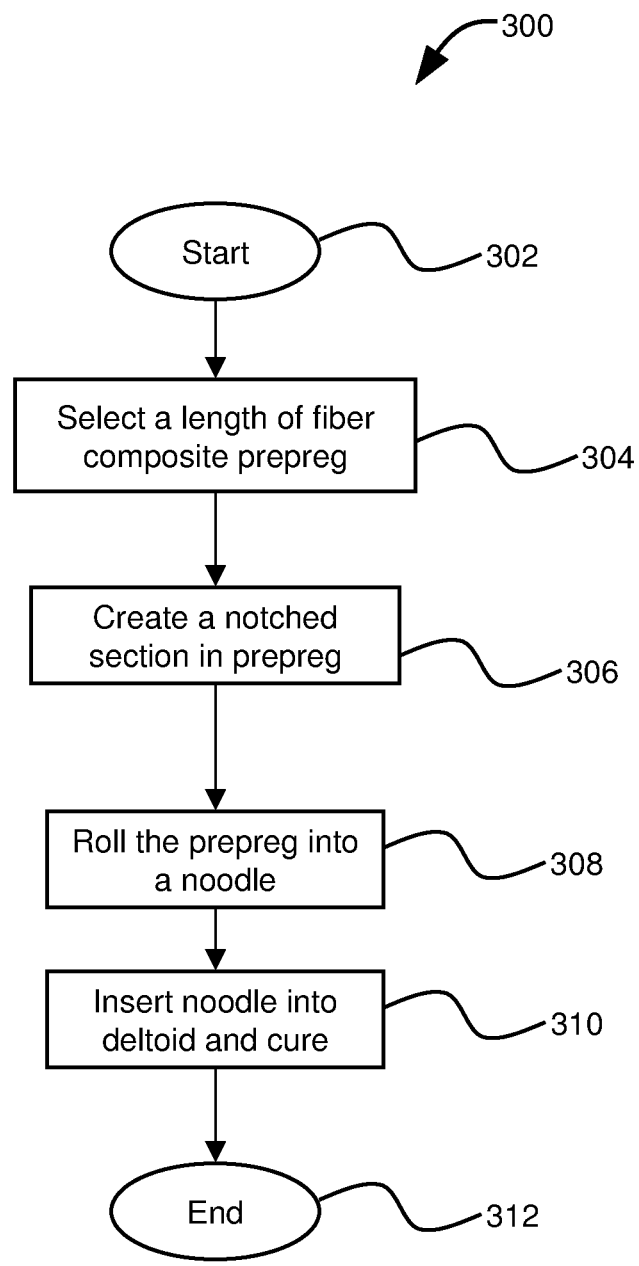
FIG. 3 illustrates a flowchart that shows a method of making a deltoid noodle used in fabricating a composite structure according to an embodiment of the invention.

FIGS. 2C-2F and 3 illustrate a method of forming a deltoid noodle, such as deltoid noodle 201 (FIG. 2A) from a continuous unidirectional composite prepreg material according to an embodiment of the invention. Referring to FIG. 3, the process is initiated at 302 and a length of fiber composite prepreg material 250 is selected in 304. Particularly, as shown in FIG. 2C, the prepreg material 250 is cut to a predetermined length 205 for the volume of the deltoid cavity that is being filled within structural member 100 (FIG. 1). The prepreg material 250 includes graphite-fibers aligned along the lengthwise direction X of the prepreg material 250. The predetermined length 205 may be calculated as a function of the theoretical volume of the deltoid cavity and the thickness of the particular prepreg material 250 that will fill the deltoid cavity (FIG. 1). In one embodiment, the prepreg material 250 is trimmed or cut along its edge 215 to conform to the variations in bulk factors along the length of the deltoid cavity.

Referring back to FIG. 3, in 306, the composite prepreg material 250 is partially cut to create a notched section. Particularly, and as shown in FIG. 2D, the additional processing of the prepreg material 250 includes the notched section 220 along its length 205 according an embodiment of the invention. Edge 215 of prepreg material 250 includes a plurality of cuts partially extending into the material 250 in direction Y to create strips in section 220, such as strip 230 having a uniform width 225. In one embodiment, section 220 is formed by shearing the unidirectional fibers in prepreg material 250 although, in other embodiments, other methods of cutting the unidirectional fibers may be utilized. The strips 230 break or chop the unidirectional fibers into short fibers, which are held within the resin matrix. In an embodiment, the prepreg material 250 is partially rolled in direction Y and notches are made in the partially rolled prepreg material 250 along direction Z (i.e., orthogonal to the longitudinal axis that is parallel to the direction X shown in FIG. 2C) prior to completing the rolling of the prepreg material 250 into a cylindrical body portion, as is shown below in FIG. 2E. It is to be appreciated that the width 225 of strip 230 may be selected based on the amount of flow of the composite material that is required during the curing process, with a narrow width providing for more flow than a wider width.

Figure 2G:
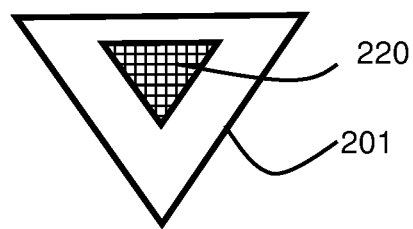
FIG. 2G illustrates a side sectional view of a graphite-fiber prepreg according to an embodiment of the invention.
Figure 2H:
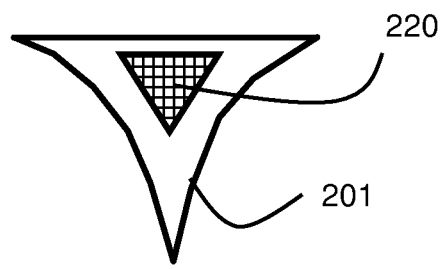
FIG. 2H illustrates a side view of a graphite-fiber prepreg according to an embodiment of the invention.

Referring back to FIG. 3, the prepreg material 250 is rolled along its width 210 (FIG. 2C) to form a deltoid noodle 201 (FIG. 2A) in 408. Particularly, the prepreg material 250 (FIG. 2E) is rolled along its width 210, starting at edge 215 (FIG. 2D), in direction Y in order to create a noodle having a cylindrical body portion with a length 205 (FIG. 2D), which is substantially the length 145 of the composite structural member 100 (FIG. 1). In this deltoid noodle 201 shown in detail in FIG. 2F, the notched section 220 (FIGS. 2D and 2F) is at the geometric center of the deltoid noodle 201 with the continuous unidirectional fibers residing along the exterior and parallel to the longitudinal axis of noodle 201, which is aligned along its length 205 (FIG. 2D). It is to be appreciated that the chopped fibers of section 220 (FIGS. 2D, 2F), which reside at the center, facilitate flow and drift of the chopped fibers of prepreg material 250 inside the deltoid cavity during processing of the deltoid noodle 201 into the structural member 100 (FIG. 1). In other embodiments, the deltoid noodle 201 may be drawn through a die to form a generally triangular shaped deltoid noodle 201 having a notched section 220 (FIGS. 2G and 2H). In 310, the noodle 201 (FIG. 2A) is inserted into the deltoid cavity for co-curing in an autoclave with the other composite sections to form a composite structure 100 (FIG. 1). The process ends at 312.

While the manufacturing technique described with reference to FIGS. 2C-2E and 3 has been illustrated with an I-beam composite structure, this manufacturing technique may be applied, in other embodiments, to the manufacture of other composite components that incorporate the use of a noodle as a filler material for deltoid cavities. In embodiments, the same technique may be used to fill a deltoid in a "T" flange or joints in aircraft composite bulkheads without departing from the scope of the invention.

The technical effects and benefits of embodiments include a deltoid noodle for filling closed cavity sections (or "deltoid") of composite structures. The deltoid noodle is processed from fiber composite prepreg to make it conformal to the manufacturing process by the deltoid noodle's ability to flow into the deltoid of composite structures. This ability to flow and fill the deltoid areas causes it to accommodate tooling mismatches during manufacturing of the composite structure. The deltoid noodle is rolled into a cylinder and includes a chopped or sliced center portion that allows the deltoid noodle to flow and conform to the deltoid in the composite structure.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangements not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of fabricating a conformal deltoid noodle, comprising:
   providing a composite prepreg material having a length and a width, the length being aligned along a longitudinal axis;
   subjecting the composite prepreg material to a cutting process to form a notched section along the length; and
   rolling the composite prepreg material along its width to create the conformal deltoid noodle;
   wherein the notched section resides substantially at the center of the deltoid noodle.

2. A method of fabricating a conformal deltoid noodle, comprising:
   providing a composite prepreg material having a length and a width, the length being aligned along a longitudinal axis;
   subjecting the composite prepreg material to a cutting process to form a notched section along the length; and
   rolling the composite prepreg material along its width to create the conformal deltoid noodle;
   wherein the composite prepreg material comprises unidirectional fibers aligned along the longitudinal axis.

3. The method of claim 1, and wherein the conformal deltoid noodle comprises a cylindrical shape longitudinally coextensive with the longitudinal axis.

4. A method of fabricating a conformal deltoid noodle, comprising:
   providing a composite prepreg material having a length and a width, the length being aligned along a longitudinal axis;
   subjecting the composite prepreg material to a cutting process to form a notched section along the length; and
   rolling the composite prepreg material along its width to create the conformal deltoid noodle;
   wherein the cutting process further comprises cutting the composite prepreg material along the length in a direction orthogonal to the longitudinal axis.

5. The method of claim 2, wherein the cutting process further comprises shearing the unidirectional fibers to form short fibers along the entire length of the notched section.

6. The method of claim 1, wherein the notched section includes a second width that is less than the width of the composite prepreg material.

7. The method of claim 1, wherein the rolling of the composite prepreg further comprises rolling the composite prepreg material along an edge residing within the notched section.

8. The method of claim 3, further comprising running the cylindrical shaped conformal deltoid noodle in a die to form a triangular shape.

9. A method of fabricating a composite component having reinforcement fibers, comprising
   providing a platform having a length extending in a direction parallel to a plane;
   providing a body including a first portion which extends in a first direction and a second portion which extends in a direction lateral to the first direction;
   engaging the platform with the first portion to define a deltoid cavity;
   forming a deltoid noodle comprising chopped fibers and unidirectional fibers;
   inserting the deltoid noodle in the deltoid cavity; and
   performing a curing process to bond the platform and the body to the deltoid noodle, thereby to form the composite component;
   wherein the forming of the deltoid noodle further comprises:
   providing a composite prepreg material having a second length and a width, the second length being aligned along a longitudinal axis;
   subjecting the composite prepreg material to a cutting process to form a notched section along the second length; and
   rolling the composite prepreg material along its width to create the deltoid noodle.

10. The method of claim 9, wherein the composite prepreg material comprises unidirectional fibers aligned along the longitudinal axis.

11. The method of claim 9, wherein the deltoid noodle comprises a cylindrical shape longitudinally coextensive with the longitudinal axis.

12. The method of claim 9, wherein the cutting process further comprises cutting the composite prepreg material along the second predetermined length in a direction orthogonal to the longitudinal axis.

13. The method of claim 10, wherein the cutting process further comprises shearing the unidirectional fibers to form short fibers along the entire length of the notched section.

14. The method of claim 9, wherein the notched section includes a second width that is less than the width of the composite prepreg material.

15. The method of claim 9, wherein the rolling of the composite prepreg further comprises rolling the composite prepreg material along an edge residing within the notched section.

16. The method of claim 9, wherein the notched section resides substantially at the center of the deltoid noodle.

17. The method of claim 11, further comprising running the cylindrical shaped deltoid noodle in a die to form a triangular shape.

* * * * *